United States Patent Office 3,696,067
Patented Oct. 3, 1972

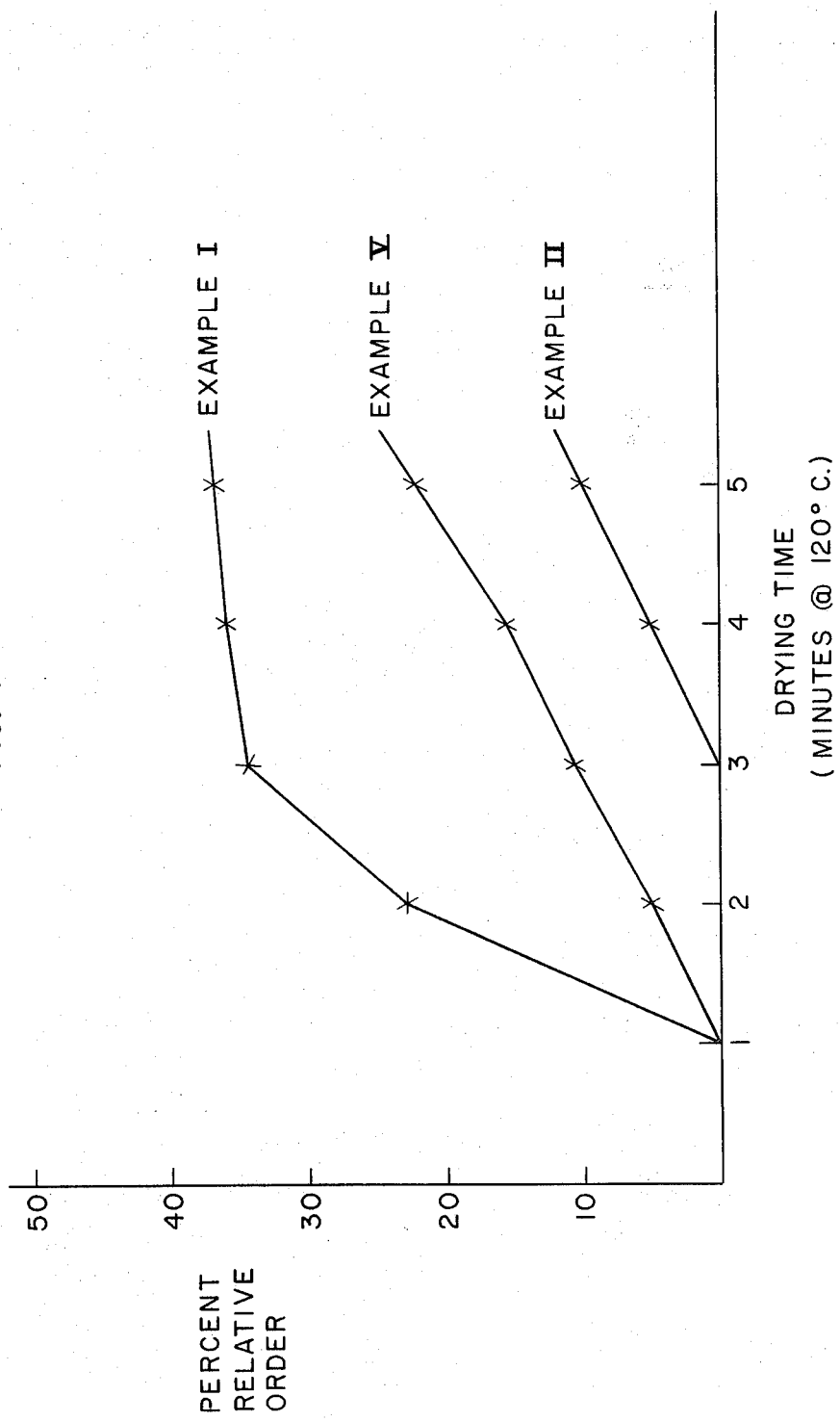

3,696,067
VINYLIDENE CHLORIDE COPOLYMER LATEX COATING COMPOSITION
Alex Trofimow, 16 Stetson St., Brookline, Mass. 02146
Filed Nov. 8, 1971, Ser. No. 196,444
Int. Cl. C08f 45/52
U.S. Cl. 260—28.5 D          5 Claims

ABSTRACT OF THE DISCLOSURE

Improved barrier coating compositions of the vinylidene chloride copolymer latex type are prepared by conducting the aqueous polymerization of vinylidene chloride and other comonomers in the presence of a small amount of emulsified paraffin wax.

---

This invention relates to coating compositions of the vinylidene chloride copolymer latex type. More particularly, this invention concerns an aqueous vinylidene chloride copolymer latex composition which exhibits improved properties when coated upon conventional packaging materials.

Aqueous vinylidene chloride copolymer latexes have been widely employed to coat packaging materials such as paper, carton board, polymeric film and metal foil. Such "barrier" latexes form coatings exhibiting a high resistance to moisture vapor transmission as well as good flexibility. One difficulty associated with polymeric barrier coatings such as vinylidene chloride polymer coatings is the tendency of stacks or rolled layers of stock coated with such materials to stick together or "block." Another difficulty arises from the tendency of the coating to stick to and accumulate on metallic parts of machinery used to form the stock into finished packaging. To diminish "blocking" and to enhance the "slip" characteristics of the coatings, further coatings of anti-tack or slip agents have been deposited upon the barrier coating. Alternatively, the agents may be added to the latex coating composition prior to the coating operation.

It has been discovered that barrier coatings deposited from aqueous vinylidene chloride copolymer latexes exhibit improved desirable characteristics when the polymerization of the vinylidene chloride and comonomer is carried out in the presence of an aqueous paraffin wax emulsion. The wax emulsion may be added in any manner desired prior to polymerization, but is preferably delivered to the reaction zone in admixture with the water or aqueous phase employed in the reaction. About 1 to 4 percent by weight of wax solids is employed, based upon the weight of the monomer. Surprisingly, the presence of the wax in the reaction mixture does not adversely affect the polymerization reaction. Also surprising is the discovery that the barrier coatings which have been polymerized in the presence of wax crystallize faster than coatings made without the wax additive or with the wax added after polymerization, that the blocking resistance of the coatings develops in a shorter period, and additionally, the solvent resistance of the barrier coatings develops at an earlier stage in the aging of the coating. Further, the flexibility of the coated board or paper remains essentially unchanged as does the moisture vapor transmission rate and the heat sealability of the coatings.

The polymerization reaction may be carried out using conventional aqueous emulsion polymerization procedures. Generally, the monomers are emulsified in water in a reaction zone in the presence of an emulsifying agent and polymerized through the agency of a water-soluble polymerization initiator. The polymerization is usually induced by heating the aqueous emulsion to about 30 to 80° C. with agitation. After polymerization is substantially complete, the pH and the total solids are often adjusted and residual monomer removed. Additional emulsifier may be added to render the latex more stable.

The monomer charge to the reaction zone comprises at least about 80 and preferably at least about 90 weight percent vinylidene chloride based upon the total weight of the monomer, the remainder being at least one monoethylenically unsaturated comonomer. Illustrative of the monoethylenically unsaturated comonomers which may be used are the vinyl halides, such as vinyl chloride and vinyl bromide; the vinyl esters, such as vinyl acetate and vinyl propionate; the vinyl ethers, such as vinyl methyl ether; acrylic monomers, such as acrylic and methacrylic acid; alkyl acrylates and methacrylates such as methyl acrylate, ethyl acrylate, butyl acrylate, methyl methacrylate, 2-ethylhexyl acrylate, etc.; and acrylonitrile. Other comonomers copolymerizable with vinylidene chloride will be well known to those skilled in the art.

The emulsifying agents and polymerization initiators employed in the present process are conventional. In general, any emulsifier capable of operating in an acid medium may be employed in the polymerization process. Exemplary emulsifiers include the soluble salts of an aryl sulfate or of a long chain alkyl-aryl sulfonate such as sodium dodecyl benzene sulfonate and sodium lauryl sulfate. Any of the conventional peroxides, persulfates or azo compounds can be utilized as initiators. Illustrative of suitable initiators are potassium persulfate, sodium persulfate, hydrogen peroxide, peracetic acid, benzoyl peroxide, azo-bis-isobutyronitrile, cumene hydroperoxide tertiary butyl perbenzoate; redox catalyst systems such as a combination of any of the peroxygen initiators aforementioned together with reducing agents such as sodium sulfite, sucrose, ferrous gluconate, etc. The amount of the polymerization initiator may be varied over a relatively wide range, but generally about 0.1 percent to about 0.5 percent by weight of initiator, based on the monomers, is employed.

The following examples serve to illustrate the invention more fully and are not intended to be limiting.

EXAMPLE I

A 1-liter, 4-neck flask equipped with stirrer and reflux condenser is charged with 350 grams of demineralized water to which has been added 1.2 grams sodium bisulfite and 22 grams of a 40% dispersion of paraffin wax in water ("ALWAX 253A," a product of American Cyanamide). The flask ingredients are then heated to 40° C. A monomer mixture containing 402.5 grams vinylidene chloride, 30 grams methyl acrylate, 7.5 grams acrylonitrile, 1.1 grams acrylic acid, and 11 grams of sodium dodecylbenzene sulfonate emulsifier is prepared and transferred to a separatory funnel connected to the flask. 44 grams of the monomer mixture were added to the aqueous phase in the flask and the reaction initiated by the dropwise addition of a 2% solution of potassium persulfate. After the monomer "pre-shot" was reacted, the remaining portion of the monomer mixture is added continuously. The reaction is carried out under moderate reflux at 38 to 40° C. After completion of the monomer addition, the product is heated slowly to 50° C. and then allowed to cool to room temperature. The resulting latex has a total solids content of 55%. The pH of the latex was adjusted to 3.0 to 3.5 with 5% sodium pyrophosphate solution, diluted to 40% total solids and then vacuum stripped of residual monomer. The final product had a total solids content of 55%.

EXAMPLE II

A latex was prepared as in Example I except that no wax emulsion was included.

EXAMPLE III

A latex was prepared as in Example I except that the monomer mixture consisted of 92 percent vinylidene chloride and 8 percent of methylacrylate.

EXAMPLE IV

A latex was prepared as in Example III, except that no wax emulsion was included.

All of the above latexes were coated on carton board by a single pass of a #16 rod. The rod applies the coating at the rate of about 12 lbs. per ream (3000 square feet of paper), producing a coating which is approximately ½ mil in thickness. The coated samples were dried at a temperature of 122° C. for periods ranging between ½ and 5 minutes. The samples were subjected to tests described below. The results are given in Table I.

The "slip angle" or the angle indicative of the coefficient of friction was measured in the following manner. A steel block weight was used which was 1.9 inches in height, 2 inches in width, and 4 inches in length, having at each end of the bottom a step 1 inch in length, 2 inches in width, and 0.25 inch in height, which was the surface in contact with the latex coating being tested. The weight of the block was 4 pounds, or 1 pound per square inch in the horizontal position. The latex coated samples to be tested were attached to a smooth wooden board with Scotch tape with the uncoated side of the sample adjacent to the wooden board. The weight was placed on the latex coated side of the sample and the board was slowly tilted until slippage occurred. This angle was recorded as an indication of the "static" coefficient of friction.

In measuring the angle indicative of the kinetic coefficient of friction, the board was raised to a predetermined angle and the weight was then placed on the latex coated surface of the test sample, and the weight was observed to see if slip occurred. The angle of the board was then changed in the proper direction and the weight again was placed on the coated surface. The angle at which the weight slipped was reported as an indication of the kinetic coefficient of friction.

Moisture vapor transmission rate (MVTR) was determined in accord with TAPPI standards T464-m-45 in which the amount of water vapor transfer is reported as grams of water vapor passed by a 100-square inch sample per 24 hour period at 90% relative humidity and 100° F.

The resistance of the coating to solvents is measured by dropping a single drop of toluene on the coating and allowing the toluene to evaporate. The dry spot is visually examined. If the spot is dull, the surface has been attacked, and solvent resistance is rated as "N." If the spot is semi-shiny the coating has a partial solvent resistance, and is rated as "P," "P—," or "P+" to accord with its appearance. If the spot is barely visible, there has been no attack of solvent, and resistance is recorded as "R" or "R—."

Blocking is measured by placing the coated stock face-to-face and back-to-back, placing a 5-pound weight on the sandwich and allowing the weight to remain in position for 24 hours. The meaning of the figures is as follows: 1=no blocking occurred; 2=slight blocking, but the plies separate without damage to the coating; 3=adhesion is so severe that on separation, either the coating or the paper stock was damaged; and 4=practially complete adhesion, and separation of the sheets is commercially impossible.

TABLE I

| Latex | Drying time minutes at 120° C. | Toluene resistance after— | | | Slip ankle | | MVTR number 16 rod single pass | Blocking at room temperature | |
|---|---|---|---|---|---|---|---|---|---|
| | | 5 days | 10 days | 27 days | Static | Kinetic | | Face-face | Face-back |
| Example I | ½ | P— | P | R— | 14 | 11 | .17 | 2 | 2 |
| | 1 | P | P+ | R— | | | | 1 | 1 |
| | 2 | P+ | | | | | | | |
| | 3 | R— | | | | | | | |
| | 4 | R— | | | | | | | |
| | 5 | R— | | | | | | | |
| Example II | ½ | N | N | N | +20 | +20 | .16 | 3-4 | 3-4 |
| | 1 | N | N | N | | | | 3-4 | 3-4 |
| | 2 | N | N | N | | | | | |
| | 3 | N | N | N | | | | | |
| | 4 | N | N | N | | | | | |
| | 5 | N | N | P— | | | | | |
| Example III | ½ | R | R | | 15 | 12 | .19 | 1 | 1 |
| | 1 | R | R | | | | | 1 | 1 |
| | 2 | | | | | | | | |
| | 3 | | | | | | | | |
| | 4 | | | | | | | | |
| | 5 | | | | | | | | |
| Example IV | ½ | P | R | | +20 | 18 | .17 | 1 | 1 |
| | 1 | R— | R | | | | | 1 | 1 |
| | 2 | R | | | | | | | |
| | 3 | | | | | | | | |
| | 4 | | | | | | | | |
| | 5 | | | | | | | | |

EXAMPLE V

A latex was prepared as in Example I, except that no wax was present during the polymerization reaction. After formation of the final polymer latex, 22 grams of the 40% paraffin wax dispersion used in the above Examples was added to the final latex.

The crystallization rate measured as the percent relative order of coatings made from the latexes of Examples I, II and V was tested for on a Beckman Infrared Spectrometer IR-9, using the conventional ATR method. Tests were made on five samples of each of the latexes, the only variable for each of the five samples being the time each of the five samples was allowed to dry at 120° C. In FIG. 1 the percent relative order obtained for each of the five test samples of each of the latexes of Examples I, II and V are plotted against the drying time, in minutes at 120° C. From FIG. 1, it is evident that the latex of Example I, which was prepared according to the invention, exhibited the fastest rate of crystallization leading to faster development of solvent and block resistance.

I claim:

1. In the method of preparing aqueous vinylidene chloride polymeric latexes useful as barrier coatings wherein a monomeric mixture containing at least about 80 weight percent vinylidene chloride with up to about 20 weight percent of at least one monoethylenic comonomer copolymerizable therewith is emulsion polymerized in the presence of water, emulsifier and a water-soluble polymerization initiator, the improvement which comprises conducting said polymerization in the presence of from about 1 to about 4 weight percent of emulsified paraffin wax, said amount of wax being the weight percent of wax solids based upon the weight of monomers in said monomeric mixture.

2. The method of claim 1 wherein the amount of wax employed is 2%.

3. The method of claim 1 wherein said wax emulsion is introduced to said reaction zone in admixture with the water employed to form the aqueous phase.

4. The method of claim 1 wherein as least about 90 weight percent of vinylidene chloride is employed.

5. The method of claim 1 wherein said comonomer comprises at least one member from the group consisting of acrylonitrile, acrylic acid, methacrylic acid, an alkyl acrylate and an alkyl methacrylate.

References Cited

UNITED STATES PATENTS

| 3,397,163 | 8/1968 | Bruno | 260—28.5 D |
| 2,990,391 | 6/1961 | Grantham | 260—28.5 D |
| 3,387,997 | 6/1968 | Sculley | 260—28.5 D |

MORRIS LIEBMAN, Primary Examiner

P. R. MICHL, Assistant Examiner